(12) United States Patent
Reedy et al.

(10) Patent No.: US 12,067,589 B2
(45) Date of Patent: *Aug. 20, 2024

(54) UTILIZING MACHINE LEARNING MODELS TO RECOMMEND TRAVEL OFFER PACKAGES RELATING TO A TRAVEL EXPERIENCE

(71) Applicant: Capital One Services, LLC, McLean, VA (US)

(72) Inventors: Matthew Reedy, Richmond, VA (US); Andrew Marr, Midlothian, VA (US); Lin Ward, Henrico, VA (US); Noble Ozoka, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,607

(22) Filed: Feb. 18, 2022

(65) Prior Publication Data

US 2022/0172243 A1    Jun. 2, 2022

Related U.S. Application Data

(63) Continuation of application No. 16/897,765, filed on Jun. 10, 2020, now Pat. No. 11,257,106.

(51) Int. Cl.
*G06Q 30/02* (2023.01)
*G06N 20/00* (2019.01)
(Continued)

(52) U.S. Cl.
CPC ......... *G06Q 30/0224* (2013.01); *G06N 20/00* (2019.01); *G06Q 30/0239* (2013.01); *G06Q 30/0261* (2013.01); *G06Q 50/14* (2013.01)

(58) Field of Classification Search
CPC ........ G06Q 50/14; G06Q 30/02; G06Q 20/04; G06Q 30/0269
See application file for complete search history.

(56) References Cited

U.S. PATENT DOCUMENTS 10,832,290 B1    11/2020   Chennavasin et al.
10,956,995 B1 *   3/2021   Fleischman ............ G06Q 50/14
(Continued)

OTHER PUBLICATIONS

Amadeus Travel Intelligence, "Data Science and AI in the Travel Industry: 12 Real-Life Use Cases," Jun. 2018, pp. 1-24, Retrieved on Jun. 2020 from URL: https://NWW.altexsoft.com/blog/datascience/data-science-and-ai-in-the-travel-industry-9-real-life-use-cases.
(Continued)

*Primary Examiner* — Saba Dagnew
(74) *Attorney, Agent, or Firm* — Harrity & Harrity, LLP

(57) ABSTRACT

A device may receive, from account entity devices, sets of transaction data for transactions between merchants and customers, and may use a first machine learning model to assign the customers to clusters based on measures of similarity among the sets of transaction data. The device may determine travel-related data items in a set of transaction data, of the sets of transaction data, associated with a set of customers assigned to a particular cluster, and may use a second machine learning model to identify a travel experience that has a threshold likelihood of being of interest to the set of customers. The device may receive offers relating to the travel experience, and may provide, to customer devices associated with customers of the set of customers, travel offer packages that include at least one of the offers relating to the travel experience.

20 Claims, 10 Drawing Sheets

(51) Int. Cl.
*G06Q 30/0207* (2023.01)
*G06Q 30/0251* (2023.01)
*G06Q 50/14* (2012.01)

(56) References Cited

U.S. PATENT DOCUMENTS

| | | | |
|---|---|---|---|
| 11,257,106 B2 | 2/2022 | Reedy et al. | |
| 2002/0161664 A1 | 10/2002 | Shaya et al. | |
| 2005/0021457 A1* | 1/2005 | Johnson | G06Q 20/04 |
| | | | 705/39 |
| 2009/0177540 A1* | 7/2009 | Quatse | G06Q 30/02 |
| | | | 705/14.26 |
| 2012/0123844 A1* | 5/2012 | Fano | G06Q 30/0207 |
| | | | 705/26.7 |
| 2014/0114705 A1 | 4/2014 | Bashvitz et al. | |
| 2014/0344343 A1* | 11/2014 | Zarkesh | H04L 63/0227 |
| | | | 709/203 |
| 2017/0061286 A1* | 3/2017 | Kumar | G06Q 30/0269 |
| 2017/0178174 A1 | 6/2017 | Mitchell | |
| 2018/0129971 A1 | 5/2018 | Vlassis et al. | |

OTHER PUBLICATIONS

Bulanov A., "How Machine Learning and AI Can Improve Travel Services," Oct. 2018, pp. 1-23, Retrieved on Jun. 2020 from URL: https://towardsdatascience.com/how-machine-learning-and-ai-can-improve-travel-services-3fc8a88664c4.

Chung F., "Can Machine Learning Improve Your Next Holiday?," Nov. 2017, pp. 1-5, Retrieved on Jun. 2020 from URL: https://medium.com/myplanet-musings/can-machine-learning-improve-your-next-holiday-16332b766abd.

Kozubska D., "How Machine Learning Is Transforming the Travel Industry?," Aug. 2018, pp. 1-6, Retrieved on Jun. 2020 from URL: https://wwwfuturescope.com/machine-learning-transforming-travel-industry.

* cited by examiner

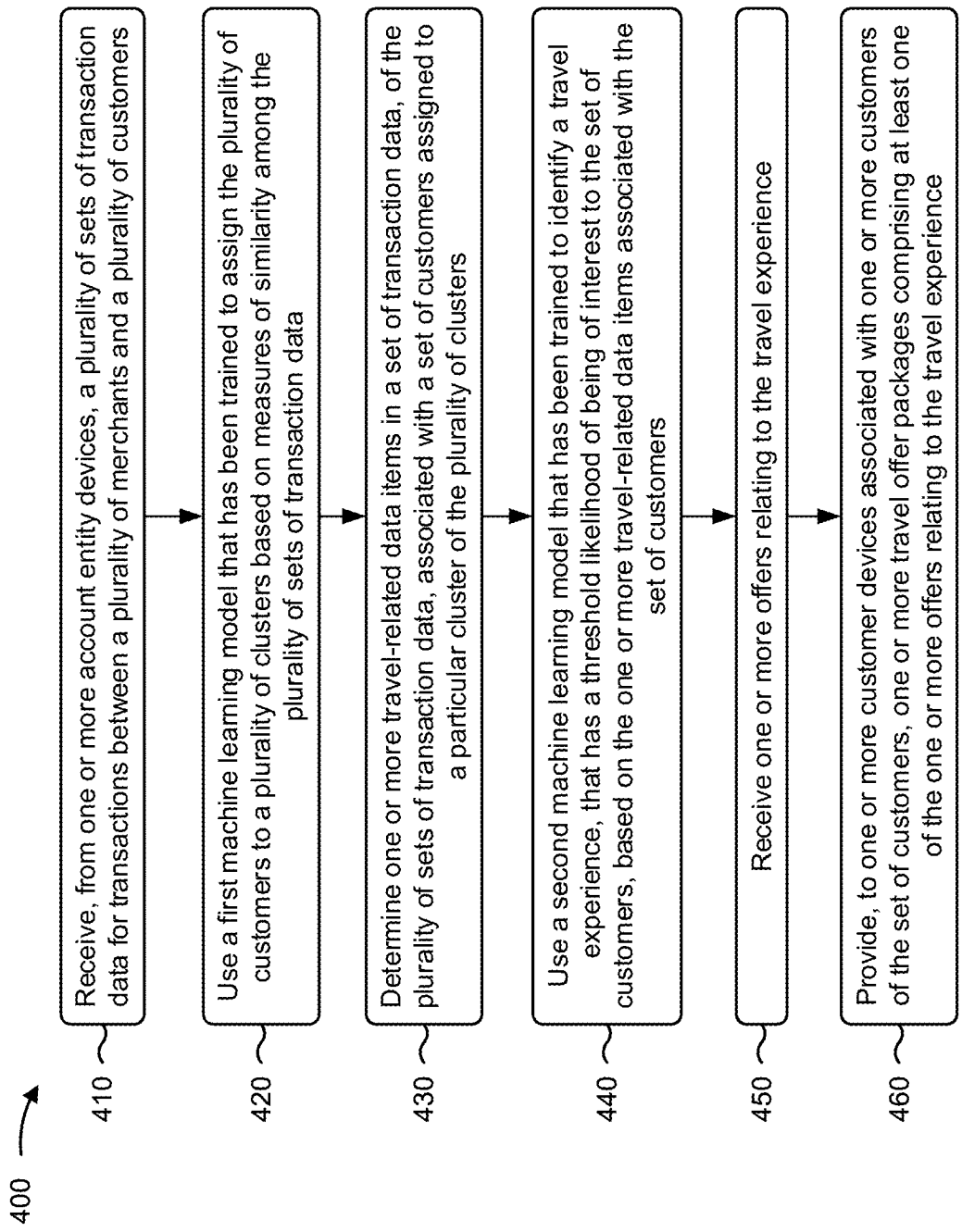

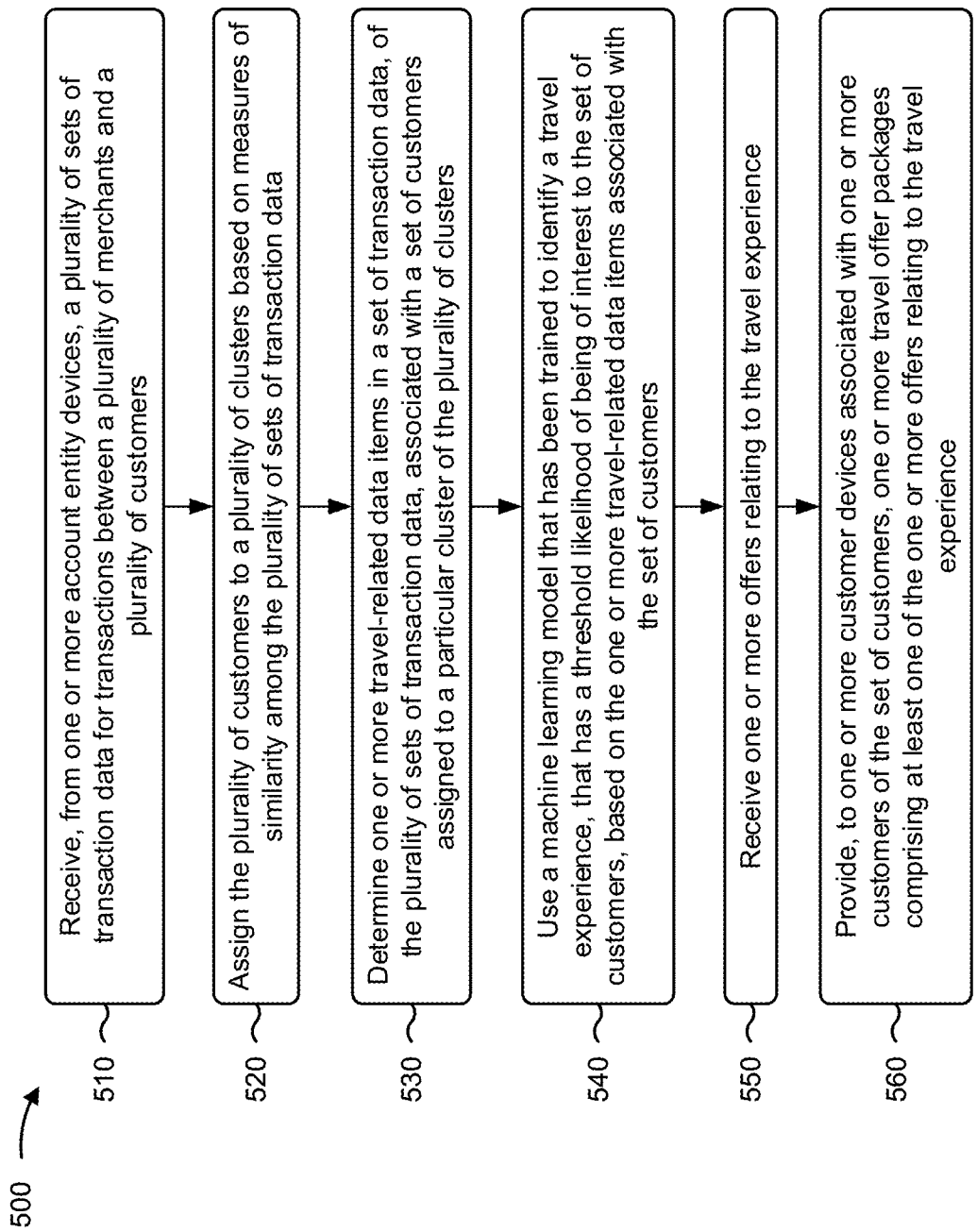

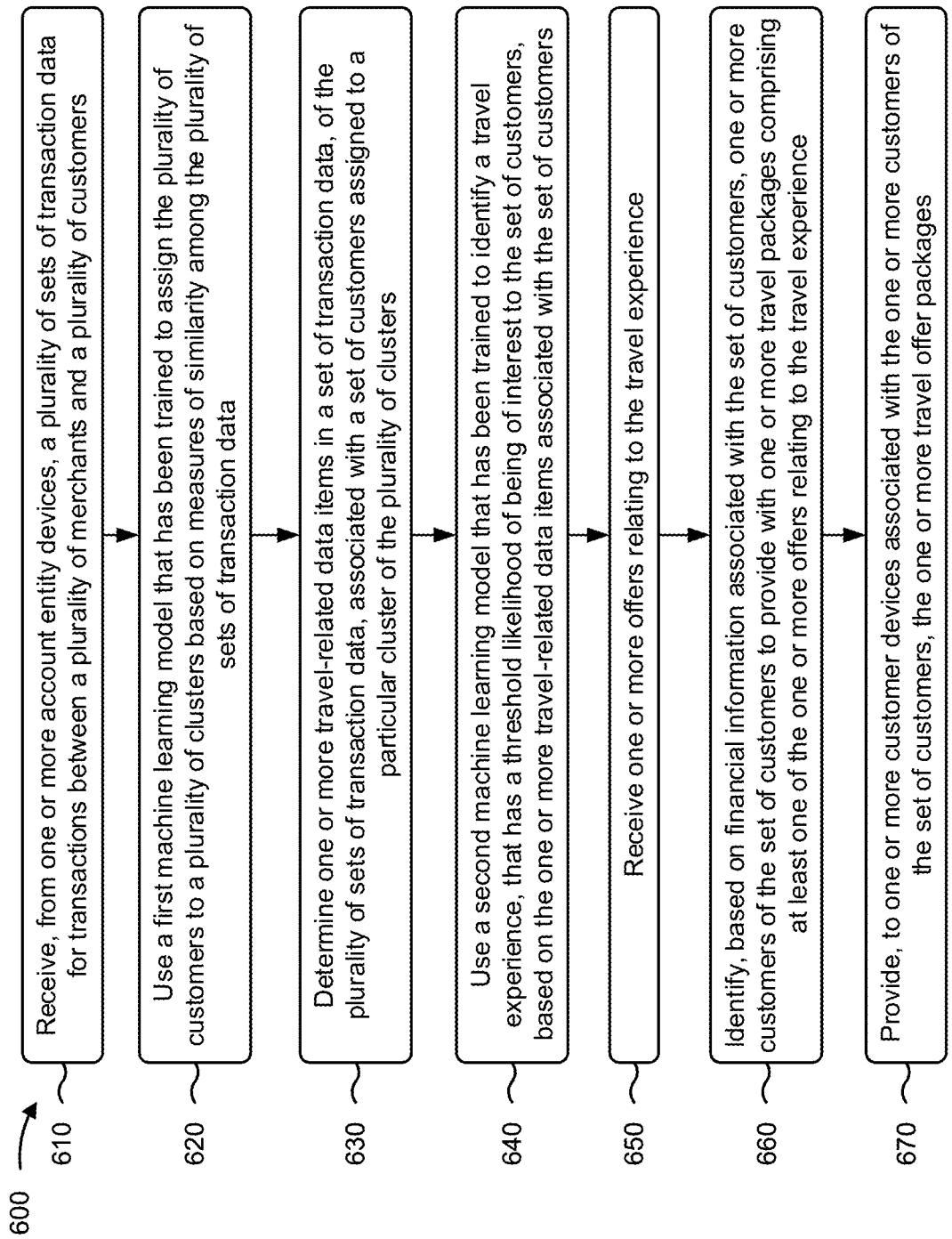

UTILIZING MACHINE LEARNING MODELS TO RECOMMEND TRAVEL OFFER PACKAGES RELATING TO A TRAVEL EXPERIENCE

RELATED APPLICATION

This application is a continuation of U.S. patent application Ser. No. 16/897,765, filed Jun. 10, 2020 (now U.S. Pat. No. 11,257,106), which is incorporated herein by reference in its entirety.

BACKGROUND

Many companies such as merchants, payment card issuers, and financial institutions regularly market products and/or services to attract new customers, increase sales to existing customers, and/or the like. Marketing strategies may include delivery of marketing material to the general public or to targeted segments of the general public.

SUMMARY

According to some implementations, a method may include receiving, from one or more account entity devices, a plurality of sets of transaction data for transactions between a plurality of merchants and a plurality of customers, and using a first machine learning model that has been trained to assign the plurality of customers to a plurality of clusters based on measures of similarity among the plurality of sets of transaction data. The method may include determining one or more travel-related data items in a set of transaction data, of the plurality of sets of transaction data, associated with a set of customers assigned to a particular cluster of the plurality of clusters, and using a second machine learning model that has been trained to identify a travel experience, that has a threshold likelihood of being of interest to the set of customers, based on the one or more travel-related data items associated with the set of customers. The method may include receiving one or more offers relating to the travel experience, and providing, to one or more customer devices associated with one or more customers of the set of customers, one or more travel offer packages comprising at least one of the one or more offers relating to the travel experience.

According to some implementations, a device may include one or more memories and one or more processors to receive, from one or more account entity devices, a plurality of sets of transaction data for transactions between a plurality of merchants and a plurality of customers, and assign the plurality of customers to a plurality of clusters based on measures of similarity among the plurality of sets of transaction data. The one or more processors may determine one or more travel-related data items in a set of transaction data, of the plurality of sets of transaction data, associated with a set of customers assigned to a particular cluster of the plurality of clusters, and may use a machine learning model that has been trained to identify a travel experience, that has a threshold likelihood of being of interest to the set of customers, based on the one or more travel-related data items associated with the set of customers. The one or more processors may receive one or more offers relating to the travel experience, and may provide, to one or more customer devices associated with one or more customers of the set of customers, one or more travel offer packages comprising at least one of the one or more offers relating to the travel experience.

According to some implementations, a non-transitory computer-readable medium may store one or more instructions that, when executed by one or more processors of a device, may cause the one or more processors to receive, from one or more account entity devices, a plurality of sets of transaction data for transactions between a plurality of merchants and a plurality of customers, and use a first machine learning model that has been trained to assign the plurality of customers to a plurality of clusters based on measures of similarity among the plurality of sets of transaction data. The one or more instructions may cause the one or more processors to determine one or more travel-related data items in a set of transaction data, of the plurality of sets of transaction data, associated with a set of customers assigned to a particular cluster of the plurality of clusters, and use a second machine learning model that has been trained to identify a travel experience, that has a threshold likelihood of being of interest to the set of customers, based on the one or more travel-related data items associated with the set of customers; receive one or more offers relating to the travel experience. The one or more instructions may cause the one or more processors to identify, based on financial information associated with the set of customers, one or more customers of the set of customers to provide with one or more travel packages comprising at least one of the one or more offers relating to the travel experience, wherein the financial information indicates one or more of a credit score, timeliness of payments for one or more associated accounts, total deposits in one or more associated accounts, or total expenses paid from the one or more associated accounts. The one or more instructions may cause the one or more processors to provide, to one or more customer devices associated with the one or more customers of the set of customers, the one or more travel offer packages.

BRIEF DESCRIPTION OF THE DRAWINGS

FIGS. 4-6 are flow charts of example processes for utilizing machine learning models to recommend travel offer packages relating to a travel experience.

DETAILED DESCRIPTION

Figure 1A:
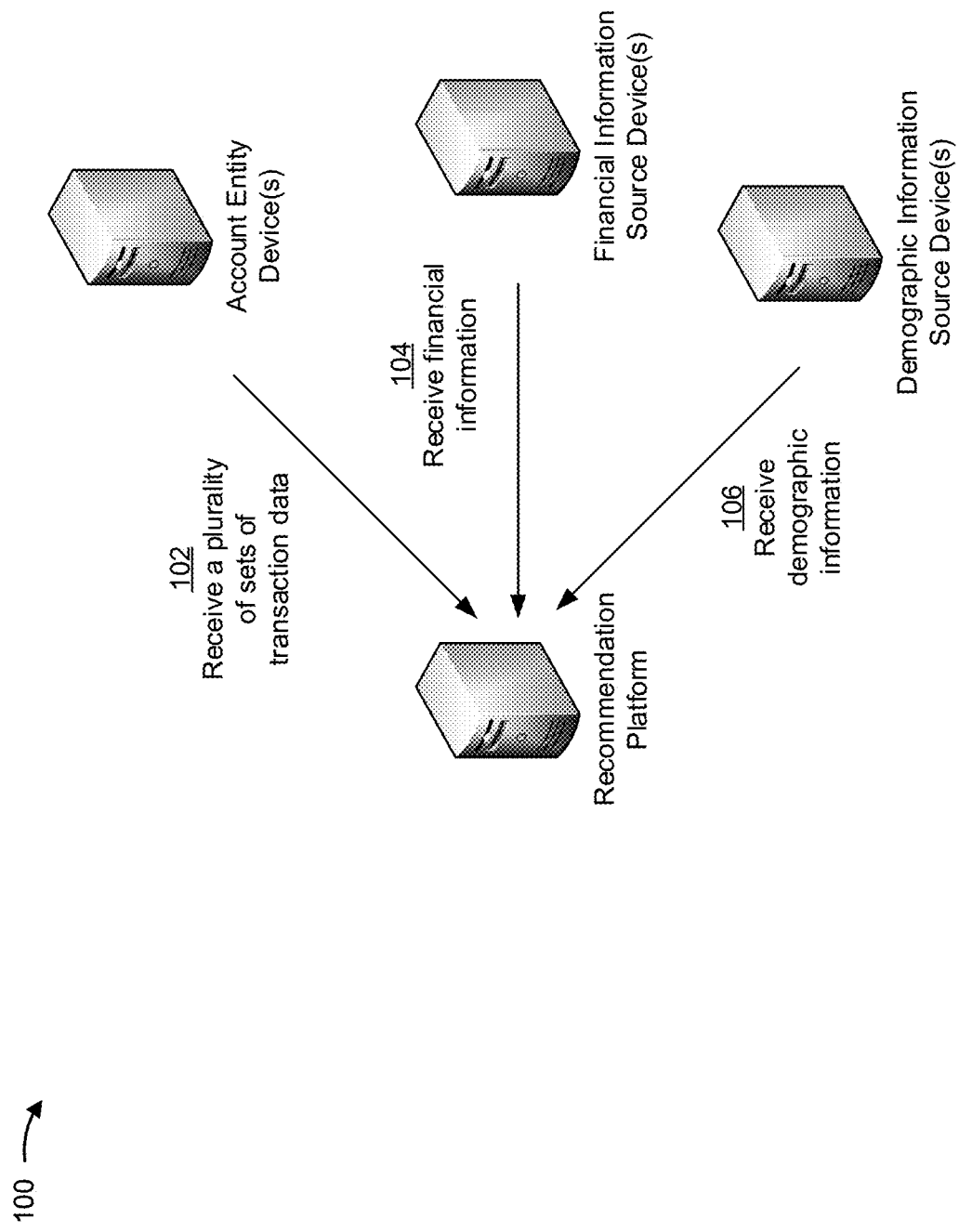
FIGS. 1A-1E are diagrams of one or more example implementations described herein.

The following detailed description of example implementations refers to the accompanying drawings. The same reference numbers in different drawings may identify the same or similar elements.

Many merchants rely on marketing strategies to attract new customers, increase sales to existing customers, introduce new products to existing customers, and/or the like. The marketing strategies may include, for example, a broad distribution of offers to people that may not become customers of the merchants, that may not be utilized by existing customers, and/or the like. Unfortunately, current techniques for attempting to attract new customers may waste computing resources (e.g., processing resources, memory resources, communication resources, and/or the like), networking resources, and/or the like associated with generating and distributing offers to people that are unlikely to become customers, generating and distributing offers to existing customers that are not utilized by the existing customers, determining different offers for people that do not become customers and/or the existing customers, and/or like.

Some implementations described herein provide a recommendation platform that utilizes machine learning models to recommend travel offer packages relating to a travel experience. For example, the recommendation platform may receive a plurality of sets of transaction data for transactions between a plurality of merchants and a plurality of customers, and may use a first machine learning model that has been trained to assign the plurality of customers to a plurality of clusters based on measures of similarity among the plurality of sets of transaction data. The recommendation platform may determine travel-related data items in a set of transaction data, of the plurality of sets of transaction data, associated with a set of customers assigned to a particular cluster of the plurality of clusters, and may use a second machine learning model that has been trained to identify a travel experience, that has a threshold likelihood of being of interest to the set of customers, based on the travel-related data items associated with the set of customers. The recommendation platform may receive offers relating to the travel experience, and may provide, to one or more customer devices associated with one or more customers of the set of customers, travel offer packages that include at least one of the offers relating to the travel experience.

In this way, the recommendation platform enables merchants to recommend travel offer packages relating to a travel experience that attract people to become customers of the merchants, that are utilized by existing customers of the merchants, and/or the like. This, in turn, conserves computing resources, networking resources, and/or the like that would otherwise be wasted in generating and distributing offers to people that are unlikely to become customers, generating and distributing offers to existing customers that are not utilized by the existing customers, determining different offers for people that do not become customers and/or the existing customers, and/or like.

FIGS. 1A-1E are diagrams of one or more example implementations 100 described herein. As shown in FIG. 1A, a recommendation platform may be associated with one or more account entity devices, one or more financial information source devices, and one or more demographic information source devices. The one or more account entity devices may be associated with one or more accounts associated with multiple customers of multiple merchants. For example, a respective account entity may include a loyalty account manager, a payment account manager, and/or the like. The one or more financial information source devices may be associated with financial institutions utilized by the multiple customers, the multiple merchants, and/or the like. The one or more demographic information source devices may be associated with entities that collect demographic information associated with the multiple customers. The recommendation platform may include a platform that utilizes machine learning models to recommend travel offer packages relating to a travel experience, in a manner described herein.

As further shown in FIG. 1A, and by reference number 102, the recommendation platform may receive a plurality of sets of transaction data from the one or more account entity devices. The plurality of sets of transaction data may include data identifying transactions between the multiple merchants and multiple customers. In some implementations, the transaction data may include transaction amounts of a plurality of transactions, identifications of merchants, identifications of transaction accounts (e.g., payment accounts, credit card accounts, bank accounts, and/or the like), dates and/or times, geographical locations, loyalty accounts (which may identify respective customers), and/or the like associated with one or more transactions of the plurality of transactions.

As further shown in FIG. 1A, and by reference number 104, the recommendation platform may receive financial information from the one or more financial information source devices. In some implementations, the financial information may include information indicating one or more credit scores for the customers, timeliness of payments for one or more associated accounts of the customers, total deposits in one or more associated accounts of the customers, total expenses paid from the one or more associated accounts of the customers, transaction cards (e.g., credit cards, debit cards, loyalty cards, and/or the like) utilized by the customers, transaction accounts associated with the merchants, and/or the like.

As further shown in FIG. 1A, and by reference number 106, the recommendation platform may receive demographic information from the one or more demographic information source devices. In some implementations, the one or more demographic information source devices may be associated with one or more account entities associated with the multiple customers. For example, a respective account entity may include a loyalty account manager, a payment account manager, and/or the like. The respective account entity may have access to demographic information, such as an age, an age bracket, a gender, an ethnicity, an income bracket, a spending bracket (e.g., indicating an amount spent during a period of time), a geographical location of an address, and/or the like for one or more of the plurality of customers. In some implementations, the demographic information may be anonymized, abstracted, and/or the like to protect personally identifiable information of the plurality of customers.

In some implementations, there may be hundreds, thousands, and/or the like, of account entity devices, financial information source devices, and/or demographic information source devices that produce thousands, millions, billions, and/or the like, of data points provided in the transaction data, the financial information, and/or the demographic information. In this way, the analytical platform may handle thousands, millions, billions, and/or the like, of data points within a period of time (e.g., daily, weekly, monthly), and thus may provide "big data" capability.

Figure 1B:
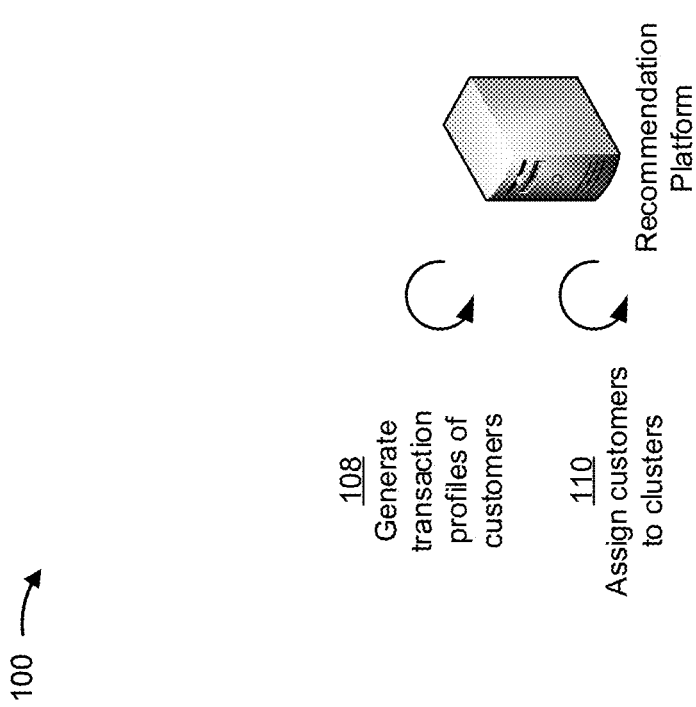

As shown in FIG. 1B, and by reference number 108, the recommendation platform may generate transaction profiles for the multiple customers based on the transaction data, the financial information, and/or the demographic information. In some implementations, the recommendation platform may aggregate the transaction data, the financial information, and/or the demographic information to generate the transaction profiles for the customers. In some implementations, the transaction profiles may include information indicating travel-related transactions performed by the customers. For example, the transaction profiles may include information identifying customers that take relaxing vacations (e.g., spend money on all-inclusive resorts, fine dining, massages, and/or the like), customers that take adventurous vacations (e.g., spend money on white water rafting and other adventurous things), customers that take sports-based vacations (e.g., spend money either spectating sporting events (e.g., baseball games) or participating in sporting events (e.g., golf outings)), customers that visit theme parks, customers that spend money doing kid-friendly things, customers that take music-based vacations (e.g., to music festivals), customers that travel to particular areas of the world, customers that travel locally, customers that take weekend trips, customers that take long trips, and/or the like.

As further shown in FIG. 1B, and by reference number 110, the recommendation platform may assign the customers to clusters of customers. In some implementations, the recommendation platform may cluster the customers, based on the customers having a level of similarity and based on the transaction profiles, that satisfies a threshold level of similarity. The level of similarity for customers of a cluster may be based on what the customers like to do (e.g., in general and on vacation), travel-related transactions associated with the customers of the cluster, travel types of the travel-related transactions associated with the customers of the cluster, quantities of the travel-related transactions associated with the customers of the cluster, spending amounts of the travel-related transactions associated with the customers of the cluster, and/or the like.

Additionally, or alternatively, the level of similarity for customers of a cluster may be based on the demographic data of the customers of the cluster. In some implementations, the recommendation model may cluster customers having a level of similarity based on the transaction profiles and based on the customers having a level of similarity of demographic information. For example, the recommendation model may generate provisional clusters of customers based on the customers having a level of similarity based on the transaction profiles, and then separate the provisional clusters into clusters based on the demographic information (e.g., separate the provisional clusters based on age brackets, ethnicities, income brackets, spending brackets, genders, geographical locations of addresses, and/or the like).

In some implementations, the recommendation platform may utilize one or more artificial intelligence models, such as a machine learning model, a deep learning model, and/or the like to cluster customers. In some implementations, the recommendation platform may utilize collaborative filtering (e.g., customer-based collaborative filtering or item based collaborative filtering) to determine clusters of customers based on the transaction profiles, the demographic information, and/or the like to cluster customers having a level of similarity that satisfies a threshold. In some implementations, the recommendation platform may utilize a non-probabilistic model, a probabilistic model, a task-based nearest neighbor model, a tool-based nearest neighbor model, a dimensionality reduction model, a Bayesian-network model, an expectation maximization model, and/or the like to perform collaborative filtering.

In some implementations, the collaborative filtering model (e.g., customer-based collaborative filtering or item based collaborative filtering) may filter for information or patterns using techniques involving collaboration among multiple agents, viewpoints, data sources, and/or the like. For example, the collaborative filtering model may make automatic predictions (e. g., filtering) about responsiveness to similar offers by a user by collecting transaction data, merchant data, demographic information, and/or the like from many customers (e.g., collaborating).

The collaborative filtering model may determine that if a first customer is associated with a transaction profile that is the same or similar to a transaction profile associated with a second customer, then the first customer is more likely to respond to an offer in a manner that is the same or similar to a manner in which the second customer will respond to the offer (e.g., to purchase a product or a service, to take a particular vacation, to travel to a particular destination, and/or the like).

In some implementations, the recommendation platform may utilize a K-nearest neighbor model to perform machine learning (e.g., pattern recognition). The K-nearest neighbor model may be a non-parametric method that may be used for classification of customers (where the classification is membership in a cluster) in which a customer is classified by a majority vote of its neighbors, with the customer being assigned to the class most common among its k nearest neighbors.

The recommendation platform may utilize any number of artificial intelligence models, machine learning models, deep learning models, and/or the like determine clusters of the customers based on the transaction profiles, the demographic information, and/or the like. For example, the recommendation platform may utilize collaborative filtering, K-nearest neighbor models, Hierarchical Dirichlet Process, and/or Dirichlet Process Regression models and/or the like to determine clusters of the customers.

In some implementations, a model utilized by the recommendation platform may be trained, with historical data (e.g., historical transaction profiles, transaction data, demographic information, financial information, and/or the like). The recommendation platform may train the model by separating the historical data into a training set, a validation set, a test set, and/or the like. The training set may be utilized to train the model. The validation set may be utilized to validate results of the trained model. The test set may be utilized to test operation of the model.

In some implementations, the recommendation platform may train the model using, for example, an unsupervised training procedure and based on the historical data. For example, the recommendation platform may perform dimensionality reduction to reduce the historical data to a minimum feature set, thereby reducing resources (e.g., processing resources, memory resources, and/or the like) to train the model, and may apply a classification technique to the minimum feature set.

In some implementations, the recommendation platform may use a logistic regression classification technique to determine a categorical outcome (e.g., clusters of customers). Additionally, or alternatively, the recommendation platform may use a naïve Bayesian classifier technique. In this case, the recommendation platform may perform binary recursive partitioning to split the historical data into partitions and/or branches and use the partitions and/or branches to determine outcomes (e.g., clusters of customers). Based on using recursive partitioning, the recommendation platform may reduce utilization of computing resources relative to manual, linear sorting and analysis of data points, thereby enabling use of thousands, millions, or billions of data points to train the model, which may result in a more accurate model than using fewer data points. Additionally, or alternatively, the recommendation platform may use a support vector machine (SVM) classifier technique to generate a non-linear boundary between data points in the training set. In this case, the non-linear boundary is used to classify test data into a particular class.

Additionally, or alternatively, the recommendation platform may train the model using a supervised training procedure that includes receiving input to the model from a subject matter expert, which may reduce an amount of time, an amount of processing resources, and/or the like to train the model relative to an unsupervised training procedure.

In some implementations, the recommendation platform may use one or more other model training techniques, such as a neural network technique, a latent semantic indexing technique, and/or the like. For example, the recommendation platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained model generated by the recommendation platform by being more robust to noisy, imprecise, or incomplete data, and by enabling the recommendation platform to detect patterns and/or trends undetectable to human analysts or systems using less complex techniques. In some implementations, the recommendation platform may train the model, with the historical data, to determine the predicted performance data. Alternatively, the recommendation platform may receive the model from another device that trains the model, with the historical data, to determine the clusters of customers.

Figure 1C:
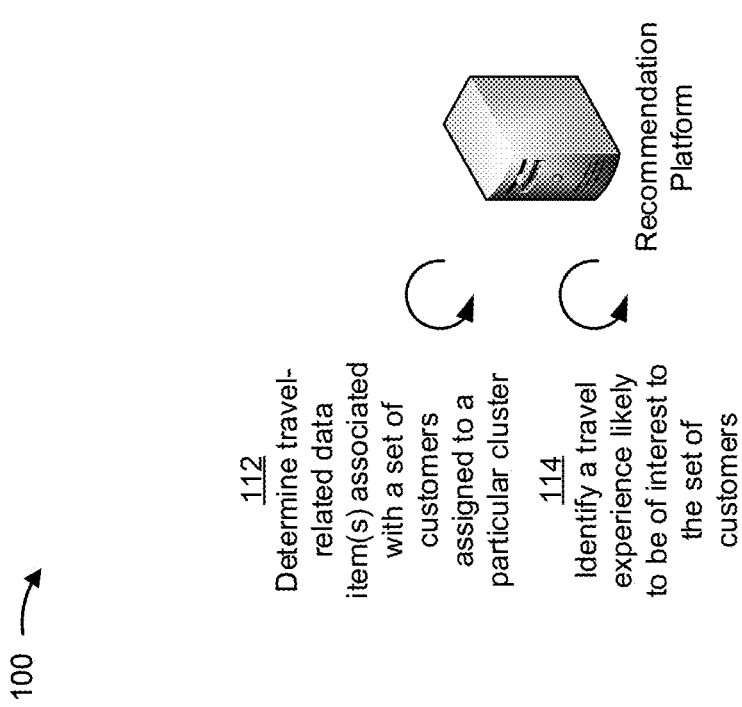

As shown in FIG. 1C, and by reference number 112, the recommendation platform may determine one or more travel-related data items in a set of transaction data, of the plurality of sets of transaction data, associated with a set of customers assigned to a particular cluster of the plurality of clusters. In some implementations, the recommendation platform may identify a travel-related topic, such as relaxing vacations, adventurous vacations, sports-based vacations, theme parks, kid-friendly things, music-based vacations, local travel destinations, international travel destinations, weekend vacations, long vacations, and/or the like. In such implementations, the recommendation may identify the particular cluster, of the plurality of clusters, based on the travel-related topic. For example, if the travel-related topic includes relaxing vacations, the recommendation platform may identify a cluster of customers that prefer relaxing vacations as the particular cluster.

The recommendation platform may then determine the one or more travel-related data items in the set of transaction data associated with the set of customers in the particular cluster. The travel-related data items may include, for example, transactions associated with all-inclusive resorts, fine dining, massages, white water rafting, other adventurous things, spectating sporting events, participating in sporting events, theme parks, kid-friendly things, music festivals, particular areas of the world, local travel destinations, weekend travel destinations, and/or the like; data identifying merchants, of the plurality of merchants, transacting with the set of customers; data identifying merchant types of the merchants, of the plurality of merchants, transacting with the set of customers; data identifying quantities of transactions with the merchants, of the plurality of merchants, transacting with the set of customers; data identifying spending amounts of transactions with the merchants, of the plurality of merchants, transacting with the set of customers; and/or the like. For example, the travel-related data items may indicate that the set of customers in the particular cluster enjoy fancy restaurants (e.g., and thus may enjoy a city known for having nice restaurants). In another example, the travel-related data items may indicate that the set of customers in the particular cluster spent time at museums (e.g., and thus may enjoy a city known for having museums). In some implementations, the travel-related data items may include other information, such as credit scores and/or payment histories of the set of customers in the particular cluster, social media posts about travel by the set of customers, and/or the like.

As further shown in FIG. 1C, and by reference number 114, the recommendation platform may identify a travel experience likely to be of interest to the set of customers. In some implementations, the recommendation platform may use a model that has been trained to identify the travel experience, that has a threshold likelihood of being of interest to the set of customers, based on the one or more travel-related data items associated with the set of customers. In some implementations, the recommendation platform may use a travel recommendation model to determine a schedule for the travel experience, and may determine the schedule, based on the set of transaction data, to increase a likelihood of the one or more customers of the set of customers to accept the one or more travel offer packages.

In some implementations, the model may include one of the models described above in connection with FIG. 1B. The recommendation platform may train the model with historical data (e.g., historical travel-related data items associated with sets of customers) to enable the model to identify the travel experience that has the threshold likelihood of being of interest to the set of customers. For example, the recommendation platform may train the model in a manner similar to the models described above in connection with FIG. 1B. In some implementations, rather than training the model, the recommendation platform may obtain the model from another system or device that trained the model. In such implementations, the recommendation platform may provide the other system or device with historical data for use in training the model, and may provide the other system or device with updated historical data to retrain the model in order to update the model.

In some implementations, the recommendation platform may utilize the model to identify a theme of the travel experience, where the theme is based on transaction data that includes descriptions of transactions with one or more of a plurality of merchants that are related to the theme. In some implementations, the recommendation platform may identify the travel experience based on the travel experience having at least a threshold likelihood of being of interest to the set of customers. The threshold likelihood may be based on a quantity of customers within the set of customers that are associated with a product that is associated with the travel experience, a service that is associated with the travel experience, an entity that is associated with the travel experience, and/or the like.

For example, if a threshold quantity of customers within the set of customers (e.g., 80%) have at least a threshold quantity of transactions (e.g., 5, 5 within the past 6 months, and/or the like) with a particular merchant, a travel experience associated with the particular merchant may be of interest to the set of customers. The interest may indicate that the 80% of the customers that are current customers of the particular merchant may have a relatively high likelihood of utilizing the travel experience. Additionally, or alternatively, the interest may indicate that the 20% of the customers that are not current customers of the particular merchant may have a relatively high likelihood of utilizing the travel experience based on being clustered with the 80% of the customers that are current customers of the particular merchant.

The travel experience may relate to relaxing vacations, adventurous vacations, sports-based vacations, theme parks, kid-friendly things, music-based vacations, local travel destinations, international travel destinations, weekend vacations, long vacations, and/or the like. For example, the travel experience may include information identifying destinations for the vacations, hotels associated with the destinations, airline options associated with traveling to the destinations, events occurring at the destinations and dates associated with the events, promotional offers associated with the vacations, and/or the like.

Figure 1D:
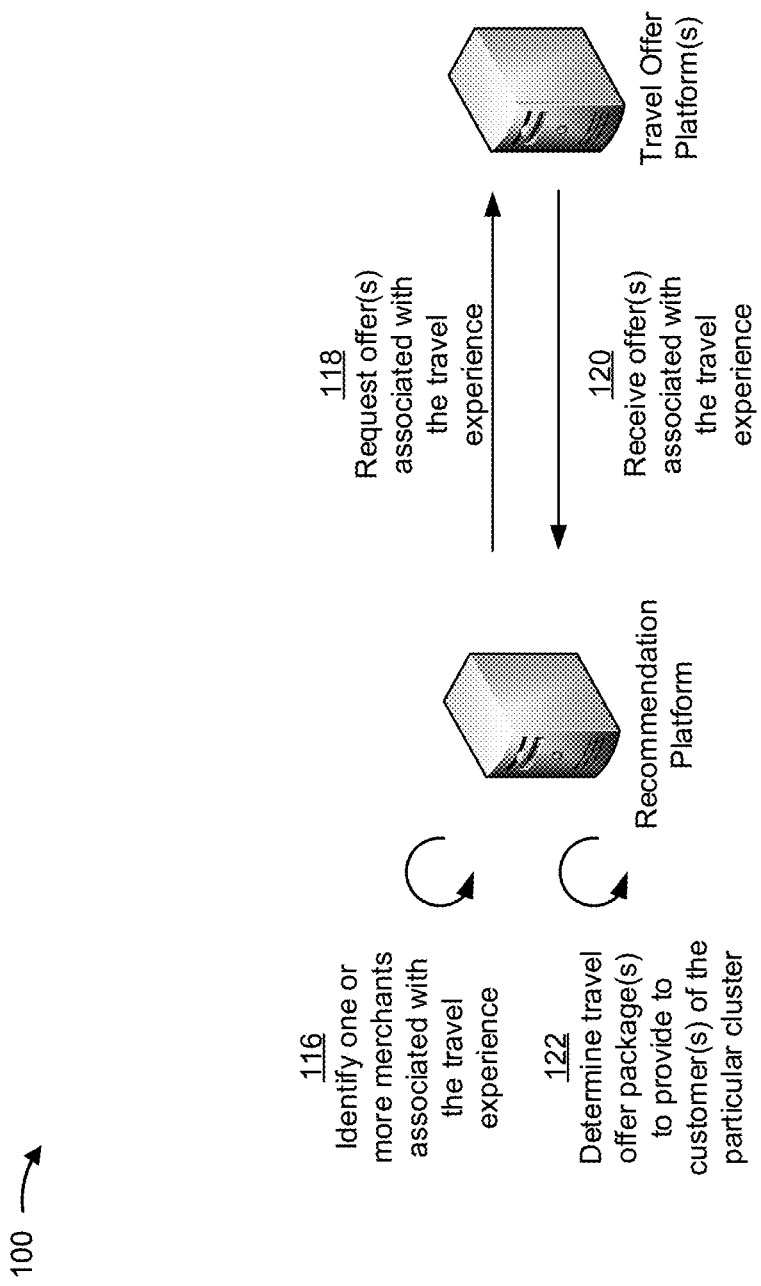

As shown in FIG. 1D, and by reference number 116, the recommendation platform may identify one or more merchants associated with the travel experience. In some implementations, the recommendation platform may determine one or more products and/or services that are relevant to the travel experience. For example, if the travel experience is a trip to a particular city, the recommendation platform may determine that transportation services (e.g., airlines, trains, taxis, rental cars, and/or the like) to the particular city, hotel accommodations in the particular city, food services (e.g., restaurants) in the particular city, entertainment services (e.g., sporting events, museums, historical landmarks, and/or the like) in the particular city, and/or the like are relevant to the travel experience. The recommendation platform may then identify merchants that provide the products and/or the services that are relevant to the travel experience as the one or more merchants associated with the travel experience.

As further shown in FIG. 1D, and by reference number 118, the recommendation platform may request, from one or more travel offer platforms, one or more offers associated with the travel experience. The one or more travel offer platforms may include platforms that identify offers associated with the products and/or the services that are relevant to the travel experience (e.g., offers generated by the one or more merchants associated with the travel experience). For example, the one or more travel platforms may provide Internet-related services and products associated with travel, lodging, entertainment, and/or the like (e.g., Expedia, trivago, Orbitz, Travelocity, and/or the like). The one or more travel offer platforms may receive the request and may identify one or more offers associated with the travel experience based on the request. The one or more offers may include offers relating to transportation services, lodging services, entertainment services, and/or the like associated with the travel experience and provided by the one or more merchants; coupons for future transactions with the one or more merchants; and/or the like.

As further shown in FIG. 1D, and by reference number 120, the recommendation platform may receive, from the one or more travel offer platforms, the one or more offers associated with the travel experience. In some implementations, the recommendation platform may identify geographical locations of the set of customers based on the set of transaction data, and may receive offers associated with traveling from the geographical locations of the set of customers to a geographical location associated with the travel experience. In some implementations, the recommendation platform may store the one or more offers associated with the travel experience in a data structure (e.g., a database, a table, a list, and/or the like) associated with the recommendation platform.

As further shown in FIG. 1D, and by reference number 122, the recommendation platform may determine one or more travel offer packages to provide to one or more customers of the particular cluster based on the one or more offers associated with the travel experience. In some implementations, each of the one or more travel offer packages may include at least one of the one or more offers associated with the travel experience. In some implementations, the recommendation platform may select, from the one or more offers relating to the travel experience, the offers to create the one or more travel offer packages. In such implementations, the recommendation platform may select the offers to create one or more travel offer packages based on the set of transaction data associated with the set of customers in the particular cluster, prices of the one or more offers relating to the travel experience, ratings of merchants associated with the one or more offers relating to the travel experience, timing associated with the one or more offers relating to the travel experience, and/or the like.

In some implementations, the recommendation platform may receive, from the one or more travel offer platforms, incentives associated with the travel experience, and may select, based on the incentives, the one or more offers to create the one or more travel offer packages. In some implementations, the recommendation platform may select the one or more offers for the one or more travel offer packages based on rewards points and reward deals associated with the one or more offers. A travel offer package may be created and a reward point value may be associated with the travel offer package based on analyzing flight and hotel costs, ticket costs, and/or the like. The reward point value for the travel offer package may fluctuate based on available deals, and may enable the recommendation platform to create customer-specific rewards travel offer packages rather than generic rewards available to everybody. If a customer of the set of customers decides to utilize a travel offer package (e.g., take a trip), the recommendation platform may provide recommendations for deals while the customer is on the trip, may enrich future recommendations by analyzing transaction data while the customer is on the trip (e.g., with information indicating things the customer did on the trip), and/or the like.

Figure 1E:
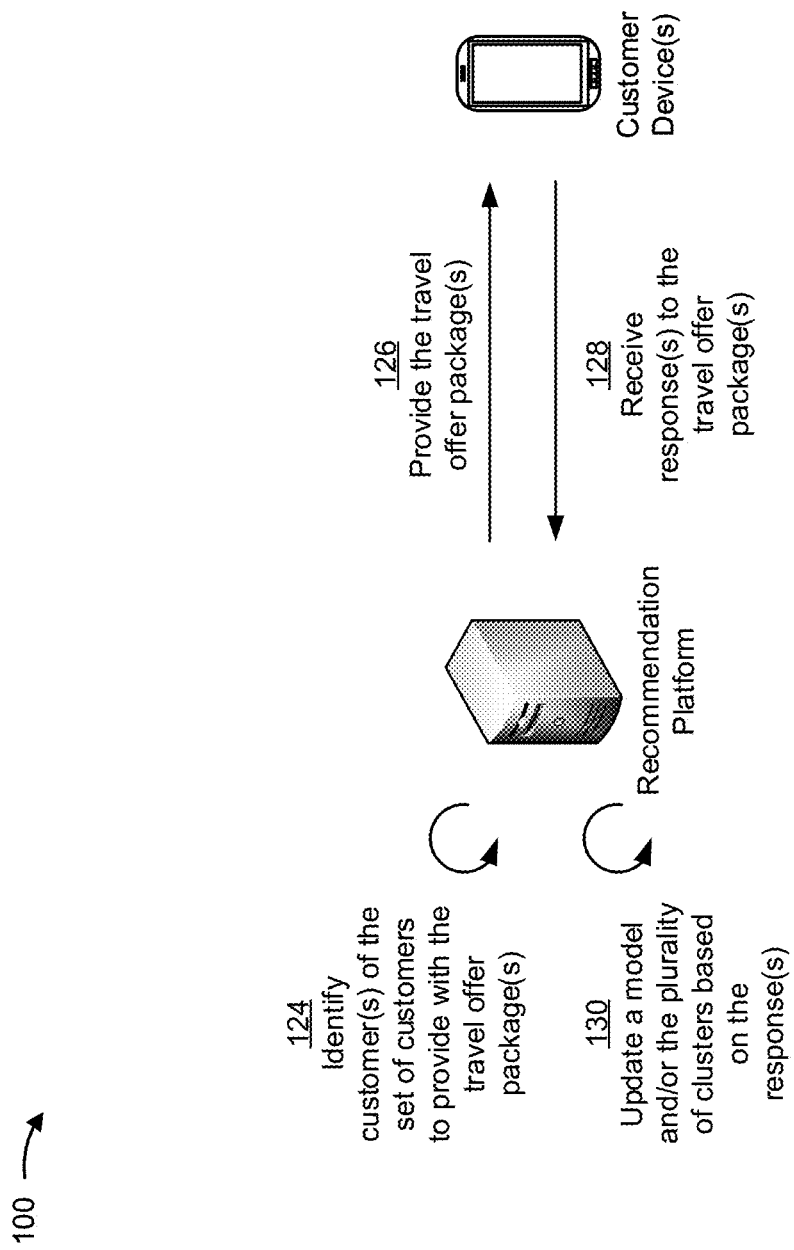

As shown in FIG. 1E, and by reference number 124, the recommendation platform may identify one or more customers of the set of customers to provide with the one or more travel offer packages. In some implementations, the recommendation platform may identify the one or more customers of the set of customers to provide with the one or more travel offer packages based on financial information indicating credit scores for the set of customers, timeliness of payments for one or more associated accounts of the set of customers, total deposits in the one or more associated accounts, total expenses paid from the one or more associated accounts, and/or the like.

In some implementations, the recommendation platform may use a customer selection model, trained using historical outcomes of providing travel offer packages to customers associated with particular transaction data, to identify the one or more customers of the set of customers to provide with the one or more travel offer packages. In some implementations, the customer selection model may include one of the models described above in connection with FIG. 1B. The recommendation platform may train the customer selection model with historical data (e.g., historical outcomes of providing travel offer packages to customers associated with particular transaction data) to enable the customer selection model to identify the one or more customers of the set of customers to provide with the one or more travel offer packages. For example, the recommendation platform may train the customer selection model in a manner similar to the models described above in connection with FIG. 1B. In some implementations, rather than training the customer selection model, the recommendation platform may obtain the customer selection model from another system or device that trained the customer selection model. In such implementations, the recommendation platform may provide the other system or device with historical data for use in training the customer selection model, and may provide the other system or device with updated historical data to retrain the customer selection model in order to update the customer selection model.

In some implementations, the recommendation platform may identify the one or more customers of the set of customers to provide with the one or more travel offer packages based on a likelihood of the one or more customers to accept the one or more travel offer packages. The recommendation platform may determine that the likelihood of the one or more customers satisfies a threshold likelihood to accept the one or more travel offer packages. The recommendation platform may determine the likelihood of the one or more customers to accept the one or more travel offer packages based on data that identifies a threshold quantity of transactions related to the one or more travel offer packages (e.g., transactions with merchants associated with the one or more travel offer packages, transactions with one or more other merchants for products and/or services related to the one or more travel offer packages, and/or the like), the demographic information, and/or the like.

For example, the recommendation platform may determine that a customer of the set of customers has a likelihood to accept the one or more travel offer packages that satisfy a threshold likelihood to accept the one or more travel offer packages based on the customer having no more than a threshold quantity of transactions with an associated merchant within a period of time, and based on the customer having at least a threshold quantity of transactions in which the customer purchased products and/or services related to the product and/or service identified in the one or more travel offer packages. For example, a product or service related to the product and/or service identified in the one or more travel offer packages may include complementary products and/or services (e.g., products and/or services that are frequently purchased together or by a same customer), the same products and/or services identified in the offer, a same type of products and/or services identified in the offer, and/or the like.

As described, the recommendation platform may identify the one or more customers of the set of customers to provide with the one or more travel offer packages based on association of the one or more travel offer packages with other customers within a same cluster. The recommendation platform is able to filter the general population to identify the one or more customers as customers that are more likely to accept the one or more travel offer packages than the general population. Filtering the general population in this way may conserve computing resources and networking resources that may otherwise be used to send the one or more travel offer packages to an unfiltered set of the general population.

As further shown in FIG. 1E, and by reference number 126, the recommendation platform may provide the one or more travel offer packages (e.g., indications of offers in the one or more travel offer packages, definitions of the offers in the one or more travel offer packages, and/or the like) to one or more customer devices (e.g., mobile devices, computing devices, and/or the like) associated with the identified one or more customers. In some implementations, the recommendation platform may provide one or more additional travel offer packages at predefined intervals to one or more customer devices associated with the identified one or more customers. The one or more customer devices may provide the one or more travel offer packages for display to the identified one or more customers.

As further shown in FIG. 1E, and by reference number 128, the recommendation platform may receive, from the one or more customer devices, one or more responses to the travel offer packages. In some implementations, the one or more responses may include acceptances of one or more of the travel offer packages, denials of one or more of the travel offer packages, acceptances and denials of one or more of the travel offer packages, requests for further information associated with the one or more travel offer packages, and/or the like.

As further shown in FIG. 1E, and by reference number 130, the recommendation platform may update a model and/or the plurality of clusters based on the one or more responses. In some implementations, the recommendation platform may update the model trained to identify the travel experience, as described above in connection with FIG. 1C, based on the one or more responses. For example, the recommendation platform may retrain the model trained to identify the travel experience based on the one or more responses. In some implementations, the recommendation platform may update the plurality of clusters by removing, from the set of customers, one or more of the customers based on the one or more responses.

In some implementations, when a particular response of the one or more responses indicates acceptance of a particular travel offer package, the recommendation platform may cause the particular travel offer package to be scheduled. For example, the recommendation platform may automatically book an airline flight, a hotel, a rental car, and/or the like; may automatically make reservations at restaurants at a particular travel destination; may automatically make reservations at spas, sports venues, museums, and/or the like; and/or the like. In some implementations, when a particular response of the one or more responses indicates denial of a particular travel offer package, the recommendation platform may revise the particular travel offer package to entice the customers to accept the revised travel offer package.

In some implementations, the recommendation platform may enable a customer to set a bucket list tracker based on available rewards associated with a recommendation. A transaction account of the customer may provide incentives to the customer in the form of rewards, and the tracker may enable the customer to visualize a goal for attaining a travel recommendation and progress to paying for the travel recommendation based on the rewards of the transaction account.

In this way, several different stages of the process for recommending travel offer packages relating to a travel experience are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning models to recommend travel offer packages relating to a travel experience, as described herein. Finally, the process for utilizing machine learning models to recommend travel offer packages relating to a travel experience conserves computing resources, networking resources, and/or the like that would otherwise be wasted in generating and distributing offers to people that are unlikely to become customers, generating and distributing offers to existing customers that are not utilized by the existing customers, determining different offers for people that do not become customers and/or the existing customers, and/or like.

As indicated above, FIGS. 1A-1E are provided merely as examples. Other examples may differ from what is described with regard to FIGS. 1A-1E.

Figure 2:
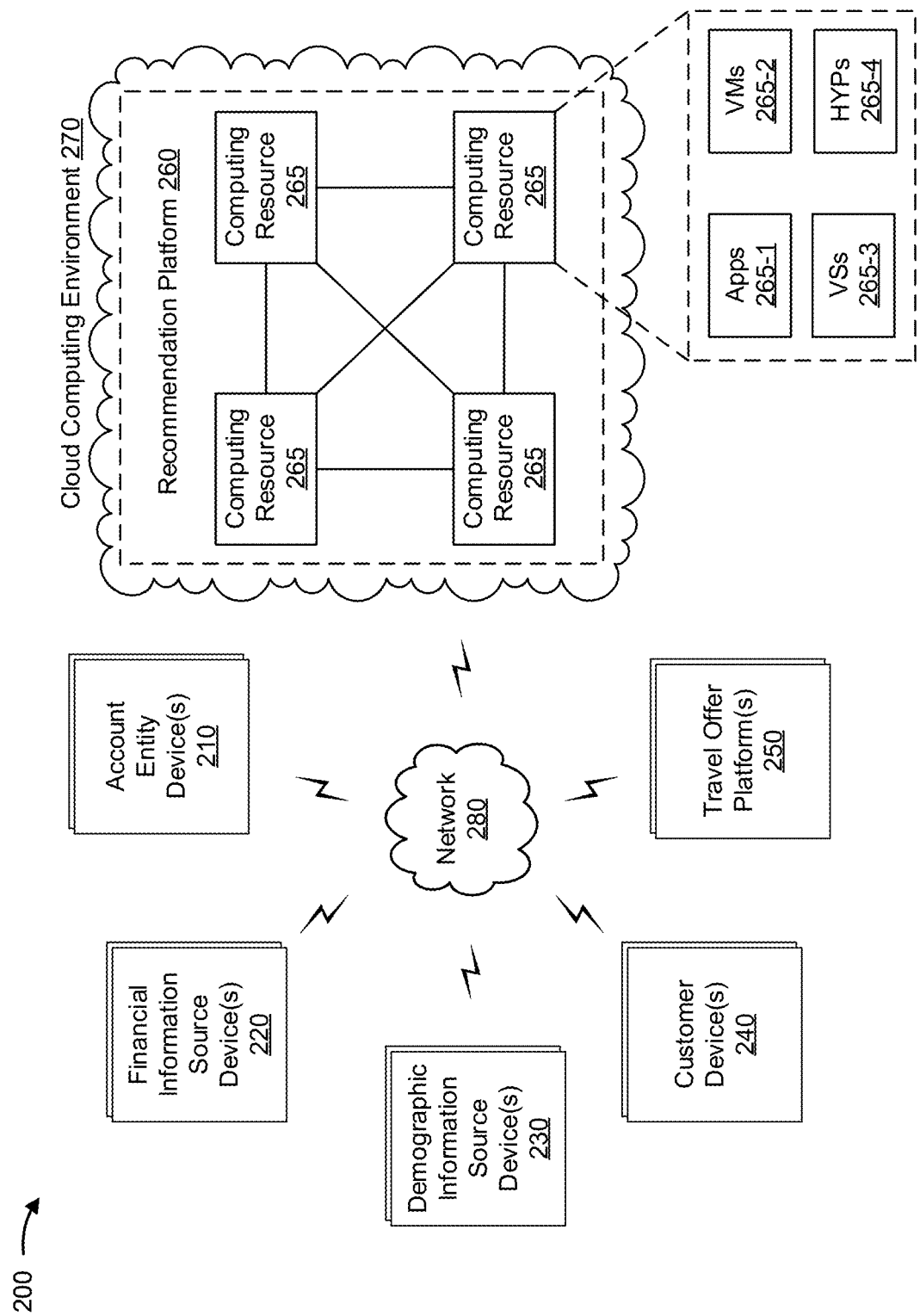
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include account entity devices 210, financial information source devices 220, demographic information source devices 230, customer devices 240, travel offer platforms 250, a recommendation platform 260, and a network 280. Devices of environment 200 may interconnect via wired connections, wireless connections, or a combination of wired and wireless connections.

Account entity device 210 includes one or more devices capable of receiving, generating, storing, processing, and/or providing information, such as information described herein. For example, account entity device 210 may include a laptop computer, a tablet computer, a desktop computer, a group of server devices, or a similar type of device, associated with a loyalty account manager, a payment account manager, and/or the like. In some implementations, account entity device 210 may receive information from and/or transmit information to customer device 240 and/or recommendation platform 260.

Financial information source device 220 includes one or more devices capable of receiving, generating, storing, processing, and/or providing information, such as information described herein. For example, financial information source device 220 may include a laptop computer, a tablet computer, a desktop computer, a group of server devices, or a similar type of device, associated with a financial institution. In some implementations, financial information source device 220 may receive information from and/or transmit information to customer device 240 and/or recommendation platform 260.

Demographic information source device 230 includes one or more devices capable of receiving, generating, storing, processing, and/or providing information, such as information described herein. For example, demographic information source device 230 may include a laptop computer, a tablet computer, a desktop computer, a group of server devices, or a similar type of device, associated with an entity that collect demographic information associated with customers of merchants. In some implementations, demographic information source device 230 may receive information from and/or transmit information to customer device 240 and/or recommendation platform 260.

Customer device 240 includes one or more devices capable of receiving, generating, storing, processing, and/or providing information, such as information described herein. For example, customer device 240 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, customer device 240 may receive information from and/or transmit information to recommendation platform 260.

Travel offer platform 250 includes one or more devices capable of receiving, generating, storing, processing, and/or providing information, such as information described herein. For example, travel offer platform 250 may include a laptop computer, a tablet computer, a desktop computer, a group of server devices, or a similar type of device, associated with an entity that collect information associated with travel offers for the customers. In some implementations, travel offer platform 250 may receive information from and/or transmit information to customer device 240 and/or recommendation platform 260.

Recommendation platform 260 includes one or more devices that may utilize machine learning models to recommend travel offer packages relating to a travel experience. In some implementations, recommendation platform 260 may be modular such that certain software components may be swapped in or out depending on a particular need. As such, recommendation platform 260 may be easily and/or quickly reconfigured for different uses. In some implementations, recommendation platform 260 may receive information from and/or transmit information to account entity devices 210, financial information source devices 220, demographic information source devices 230, customer devices 240, and/or travel offer platforms 250.

In some implementations, as shown, recommendation platform 260 may be hosted in a cloud computing environment 270. Notably, while implementations described herein describe recommendation platform 260 as being hosted in cloud computing environment 270, in some implementations, recommendation platform 260 may be non-cloud-based (i.e., may be implemented outside of a cloud computing environment) or may be partially cloud-based.

Cloud computing environment 270 includes an environment that may host recommendation platform 260. Cloud computing environment 270 may provide computation, software, data access, storage, etc. services that do not require end-customer knowledge of a physical location and configuration of system(s) and/or device(s) that host recommendation platform 260. As shown, cloud computing environment 270 may include a group of computing resources 265 (referred to collectively as "computing resources 265" and individually as "computing resource 265").

Computing resource 265 includes one or more personal computers, workstation computers, server devices, or other types of computation and/or communication devices. In some implementations, computing resource 265 may host recommendation platform 260. The cloud resources may include compute instances executing in computing resource 265, storage devices provided in computing resource 265, data transfer devices provided by computing resource 265, etc. In some implementations, computing resource 265 may communicate with other computing resources 265 via wired connections, wireless connections, or a combination of wired and wireless connections.

As further shown in FIG. 2, computing resource 265 includes a group of cloud resources, such as one or more applications ("APPs") 265-1, one or more virtual machines ("VMs") 265-2, virtualized storage ("VSs") 265-3, one or more hypervisors ("HYPs") 265-4, and/or the like.

Application 265-1 includes one or more software applications that may be provided to or accessed by customer device 240. Application 265-1 may eliminate a need to install and execute the software applications on customer device 240. For example, application 265-1 may include software associated with recommendation platform 260 and/or any other software capable of being provided via cloud computing environment 270. In some implementations, one application 265-1 may send/receive information to/from one or more other applications 265-1, via virtual machine 265-2.

Virtual machine 265-2 includes a software implementation of a machine (e.g., a computer) that executes programs like a physical machine. Virtual machine 265-2 may be either a system virtual machine or a process virtual machine, depending upon use and degree of correspondence to any real machine by virtual machine 265-2. A system virtual machine may provide a complete system platform that supports execution of a complete operating system ("OS"). A process virtual machine may execute a single program and may support a single process. In some implementations, virtual machine 265-2 may execute on behalf of a customer (e.g., a customer of customer device 240 or an operator of recommendation platform 260), and may manage infrastructure of cloud computing environment 270, such as data management, synchronization, or long-duration data transfers.

Virtualized storage 265-3 includes one or more storage systems and/or one or more devices that use virtualization techniques within the storage systems or devices of computing resource 265. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end customers. File virtualization may eliminate dependencies between data accessed at a file level and a location where files are physically stored. This may enable optimization of storage use, server consolidation, and/or performance of non-disruptive file migrations.

Hypervisor 265-4 may provide hardware virtualization techniques that allow multiple operating systems (e.g., "guest operating systems") to execute concurrently on a host computer, such as computing resource 265. Hypervisor 265-4 may present a virtual operating platform to the guest operating systems and may manage the execution of the guest operating systems. Multiple instances of a variety of operating systems may share virtualized hardware resources.

Network 280 includes one or more wired and/or wireless networks. For example, network 280 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
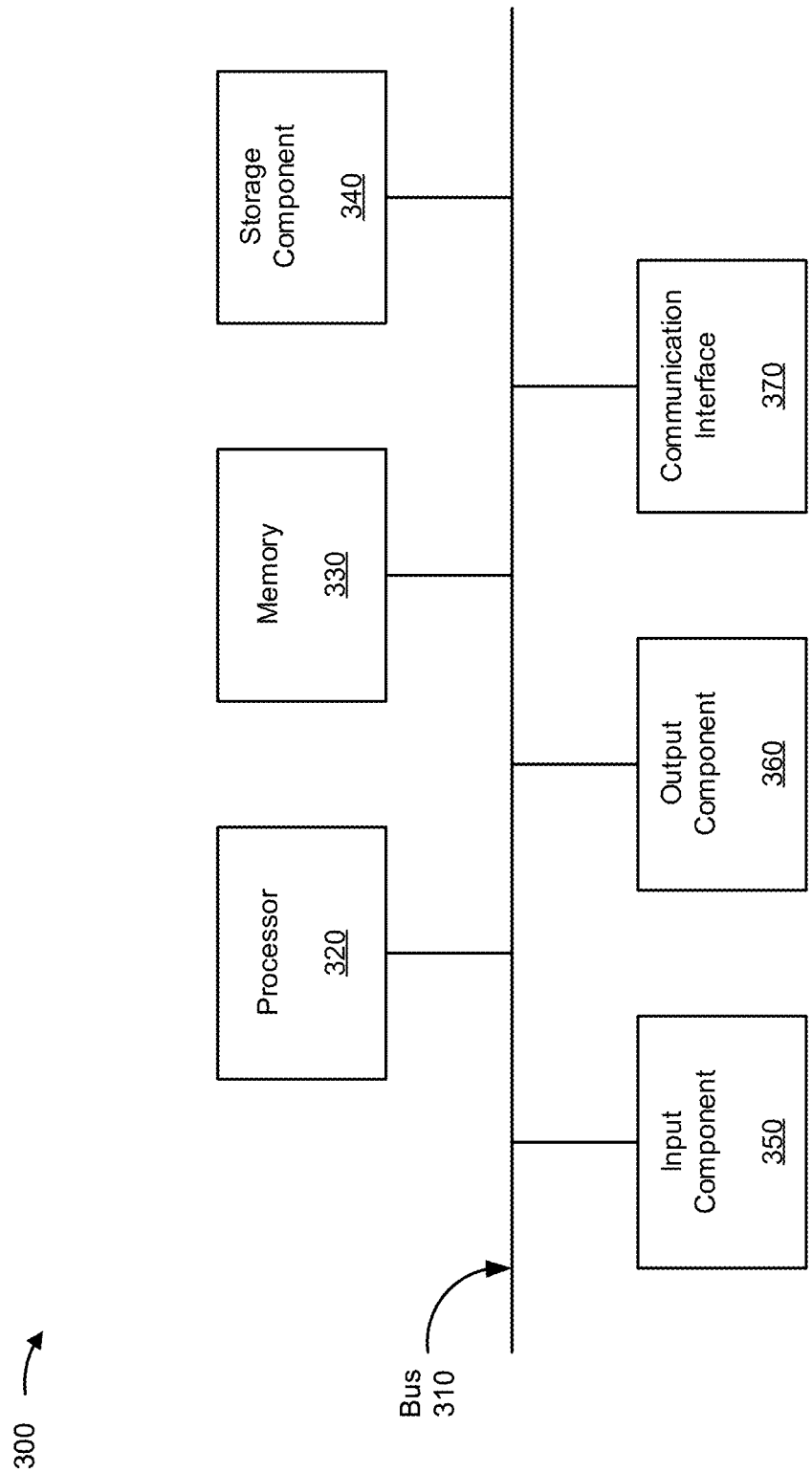
FIG. 3 is a diagram of example components of one or more devices of FIG. 2.

FIG. 3 is a diagram of example components of a device 300. Device 300 may correspond to account entity device 210, financial information source device 220, demographic information source device 230, customer device 240, travel offer platform 250, recommendation platform 260, and/or computing resource 265. In some implementations, account entity device 210, financial information source device 220, demographic information source device 230, customer device 240, travel offer platform 250, recommendation platform 260, and/or computing resource 265 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via customer input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning models to recommend travel offer packages relating to a travel experience. In some implementations, one or more process blocks of FIG. 4 may be performed by a recommendation platform (e.g., recommendation platform 260). In some implementations, one or more process blocks of FIG. 4 may be performed by another device or a group of devices separate from or including the recommendation platform, such as an account entity device (e.g., account entity device 220), a customer device (e.g., customer device 240), and/or the like.

As shown in FIG. 4, process 400 may include receiving, from one or more account entity devices, a plurality of sets of transaction data for transactions between a plurality of merchants and a plurality of customers (block 410). For example, the device (e.g., using computing resource 265, processor 320, communication interface 370, and/or the like) may receive, from one or more account entity devices, a plurality of sets of transaction data for transactions between a plurality of merchants and a plurality of customers, as described above.

As further shown in FIG. 4, process 400 may include using a first machine learning model that has been trained to assign the plurality of customers to a plurality of clusters based on measures of similarity among the plurality of sets of transaction data (block 420). For example, the device (e.g., using computing resource 265, processor 320, memory 330, and/or the like) may use a first machine learning model that has been trained to assign the plurality of customers to a plurality of clusters based on measures of similarity among the plurality of sets of transaction data, as described above.

As further shown in FIG. 4, process 400 may include determining one or more travel-related data items in a set of transaction data, of the plurality of sets of transaction data, associated with a set of customers assigned to a particular cluster of the plurality of clusters (block 430). For example, the device (e.g., using computing resource 265, processor 320, storage component 340, and/or the like) may determine one or more travel-related data items in a set of transaction data, of the plurality of sets of transaction data, associated with a set of customers assigned to a particular cluster of the plurality of clusters, as described above.

As further shown in FIG. 4, process 400 may include using a second machine learning model that has been trained to identify a travel experience, that has a threshold likelihood of being of interest to the set of customers, based on the one or more travel-related data items associated with the set of customers (block 440). For example, the device (e.g., using computing resource 265, processor 320, memory 330, storage component 340, and/or the like) may use a second machine learning model that has been trained to identify a travel experience, that has a threshold likelihood of being of interest to the set of customers, based on the one or more travel-related data items associated with the set of customers, as described above.

As further shown in FIG. 4, process 400 may include receiving one or more offers relating to the travel experience (block 450). For example, the device (e.g., using computing resource 265, processor 320, communication interface 370, and/or the like) may receive one or more offers relating to the travel experience, as described above.

As further shown in FIG. 4, process 400 may include providing, to one or more customer devices associated with one or more customers of the set of customers, one or more travel offer packages comprising at least one of the one or more offers relating to the travel experience (block 460). For example, the device (e.g., using computing resource 265, processor 320, memory 330, storage component 340, communication interface 370, and/or the like) may provide, to one or more customer devices associated with one or more customers of the set of customers, one or more travel offer packages comprising at least one of the one or more offers relating to the travel experience, as described above.

Process 400 may include additional implementations, such as any single implementation or any combination of implementations described below and/or in connection with one or more other processes described elsewhere herein.

In a first implementation, receiving the one or more offers relating to the travel experience may include receiving, from one or more travel offer platforms, offers relating to the travel experience, and process 400 may include selecting, from the offers relating to the travel experience, the one or more offers to create the one or more travel offer packages, and selecting the one or more offers is based on one or more of: the set of transaction data, prices of the one or more offers relating to the travel experience, ratings of merchants associated with the one or more offers relating to the travel experience, or timing associated with the one or more offers relating to the travel experience.

In a second implementation, alone or in combination with the first implementation, receiving the one or more offers relating to the travel experience may include receiving, from one or more travel offer platforms, incentives associated with the travel experience, and process 400 may include selecting, based on the incentives, the one or more offers to create the one or more travel offer packages.

In a third implementation, alone or in combination with one or more of the first and second implementations, process 400 may include identifying geographical locations of the set of customers based on the set of transaction data, wherein receiving the one or more offers relating to the travel experience may include receiving offers associated with traveling from the geographical locations of the set of customers to a geographical location associated with the travel experience.

In a fourth implementation, alone or in combination with one or more of the first through third implementations, process 400 may include receiving, from the one or more customer devices, one or more responses to the one or more travel offer packages; and updating the second machine learning model based on the one or more responses.

In a fifth implementation, alone or in combination with one or more of the first through fourth implementations, process 400 may include receiving, from the one or more customer devices, one or more responses to the one or more travel offer packages; and removing, from the set of customers, one or more of the customers based on the one or more responses.

In a sixth implementation, alone or in combination with one or more of the first through fifth implementations, the one or more travel-related data items may relate to one or more of merchants, of the plurality of merchants, transacting with the set of customers, merchant types of the merchants, of the plurality of merchants, transacting with the set of customers, quantities of transactions with the merchants, of the plurality of merchants, transacting with the set of customers, or spending amounts of transactions with the merchants, of the plurality of merchants, transacting with the set of customers.

In a seventh implementation, alone or in combination with one or more of the first through sixth implementations, process 400 may include receiving, for customers of the plurality of customers, respectively, financial information that indicates one or more of a credit score, timeliness of payments for one or more is associating accounts, total deposits in the one or more is associating accounts, or total expenses is paying from the one or more associated accounts; and identifying the one or more customers of the set of customers to provide with the one or more travel offer packages based on the financial information.

In an eighth implementation, alone or in combination with one or more of the first through seventh implementations, process 400 may include receiving, for customers of the plurality of customers, respectively, financial information that indicates one or more of a credit score, timeliness of payments for one or more is associating accounts, total deposits in the one or more is associating accounts, or total expenses is paying from the one or more associated accounts, wherein the first machine learning model may have been trained to assign the plurality of customers to the plurality of clusters further based on the financial information.

In a ninth implementation, alone or in combination with one or more of the first through eighth implementations, process 400 may include receiving, for customers of the plurality of customers, respectively, demographic information, wherein the first machine learning model may have been trained to assign the plurality of customers to the plurality of clusters further based on measures of similarity of the demographic information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning models to recommend travel offer packages relating to a travel experience. In some implementations, one or more process blocks of FIG. 5 may be performed by a recommendation platform (e.g., recommendation platform 260). In some implementations, one or more process blocks of FIG. 5 may be performed by another device or a group of devices separate from or including the recommendation platform, such as an account entity device (e.g., account entity device 220), a customer device (e.g., customer device 240), and/or the like.

As shown in FIG. 5, process 500 may include receiving, from one or more account entity devices, a plurality of sets of transaction data for transactions between a plurality of merchants and a plurality of customers (block 510). For example, the device (e.g., using computing resource 265, processor 320, communication interface 370, and/or the like) may receive, from one or more account entity devices, a plurality of sets of transaction data for transactions between a plurality of merchants and a plurality of customers, as described above.

As further shown in FIG. 5, process 500 may include assigning the plurality of customers to a plurality of clusters based on measures of similarity among the plurality of sets of transaction data (block 520). For example, the device (e.g., using computing resource 265, processor 320, memory 330, and/or the like) may assign the plurality of customers to a plurality of clusters based on measures of similarity among the plurality of sets of transaction data, as described above.

As further shown in FIG. 5, process 500 may include determining one or more travel-related data items in a set of transaction data, of the plurality of sets of transaction data, associated with a set of customers assigned to a particular cluster of the plurality of clusters (block 530). For example, the device (e.g., using computing resource 265, processor 320, storage component 340, and/or the like) may determine one or more travel-related data items in a set of transaction data, of the plurality of sets of transaction data, associated with a set of customers assigned to a particular cluster of the plurality of clusters, as described above.

As further shown in FIG. 5, process 500 may include using a machine learning model that has been trained to identify a travel experience, that has a threshold likelihood of being of interest to the set of customers, based on the one or more travel-related data items associated with the set of customers (block 540). For example, the device (e.g., using computing resource 265, processor 320, memory 330, storage component 340, and/or the like) may use a machine learning model that has been trained to identify a travel experience, that has a threshold likelihood of being of interest to the set of customers, based on the one or more travel-related data items associated with the set of customers, as described above.

As further shown in FIG. 5, process 500 may include receiving one or more offers relating to the travel experience (block 550). For example, the device (e.g., using computing resource 265, processor 320, communication interface 370, and/or the like) may receive one or more offers relating to the travel experience, as described above.

As further shown in FIG. 5, process 500 may include providing, to one or more customer devices associated with one or more customers of the set of customers, one or more travel offer packages comprising at least one of the one or more offers relating to the travel experience (block 560). For example, the device (e.g., using computing resource 265, processor 320, memory 330, storage component 340, communication interface 370, and/or the like) may provide, to one or more customer devices associated with one or more customers of the set of customers, one or more travel offer packages comprising at least one of the one or more offers relating to the travel experience, as described above.

Process 500 may include additional implementations, such as any single implementation or any combination of implementations described below and/or in connection with one or more other processes described elsewhere herein.

In a first implementation, the machine learning model may be trained using historical outcomes of providing travel offer packages to customers and historical sets of transaction data associated with the customers.

In a second implementation, alone or in combination with the first implementation, using the machine learning model may include identifying the travel experience having a theme that is based on the set of transaction data including descriptions of transactions with one or more of the plurality of merchants that are related to the theme.

In a third implementation, alone or in combination with one or more of the first and second implementations, process 50 may include providing one or more additional travel offer packages at predefined intervals.

In a fourth implementation, alone or in combination with one or more of the first through third implementations, process 500 may include using a travel recommendation model to determine a schedule for the travel experience, wherein the schedule may be determined, based on the set of transaction data, to increase a likelihood of the one or more customers of the set of customers to accept the one or more travel offer packages.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning models to recommend travel offer packages relating to a travel experience. In some implementations, one or more process blocks of FIG. 6 may be performed by a recommendation platform (e.g., recommendation platform 260). In some implementations, one or more process blocks of FIG. 6 may be performed by another device or a group of devices separate from or including the recommendation platform, such as an account entity device (e.g., account entity device 220), a customer device (e.g., customer device 240), and/or the like.

As shown in FIG. 6, process 600 may include receiving, from one or more account entity devices, a plurality of sets of transaction data for transactions between a plurality of merchants and a plurality of customers (block 610). For example, the device (e.g., using computing resource 265, processor 320, communication interface 370, and/or the like) may receive, from one or more account entity devices, a plurality of sets of transaction data for transactions between a plurality of merchants and a plurality of customers, as described above.

As further shown in FIG. 6, process 600 may include using a first machine learning model that has been trained to assign the plurality of customers to a plurality of clusters based on measures of similarity among the plurality of sets of transaction data (block 620). For example, the device (e.g., using computing resource 265, processor 320, memory 330, and/or the like) may use a first machine learning model that has been trained to assign the plurality of customers to a plurality of clusters based on measures of similarity among the plurality of sets of transaction data, as described above.

As further shown in FIG. 6, process 600 may include determining one or more travel-related data items in a set of transaction data, of the plurality of sets of transaction data, associated with a set of customers assigned to a particular cluster of the plurality of clusters (block 630). For example, the device (e.g., using computing resource 265, processor 320, storage component 340, and/or the like) may determine one or more travel-related data items in a set of transaction data, of the plurality of sets of transaction data, associated with a set of customers assigned to a particular cluster of the plurality of clusters, as described above.

As further shown in FIG. 6, process 600 may include using a second machine learning model that has been trained to identify a travel experience, that has a threshold likelihood of being of interest to the set of customers, based on the one or more travel-related data items associated with the set of customers (block 640). For example, the device (e.g., using computing resource 265, processor 320, memory 330, storage component 340, and/or the like) may use a second machine learning model that has been trained to identify a travel experience, that has a threshold likelihood of being of interest to the set of customers, based on the one or more travel-related data items associated with the set of customers, as described above.

As further shown in FIG. 6, process 600 may include receiving one or more offers relating to the travel experience (block 650). For example, the device (e.g., using computing resource 265, processor 320, communication interface 370, and/or the like) may receive one or more offers relating to the travel experience, as described above.

As further shown in FIG. 6, process 600 may include identifying, based on financial information associated with the set of customers, one or more customers of the set of customers to provide with one or more travel packages comprising at least one of the one or more offers relating to the travel experience (block 660). For example, the device (e.g., using computing resource 265, processor 320, memory 330, and/or the like) may identify, based on financial information associated with the set of customers, one or more customers of the set of customers to provide with one or more travel packages comprising at least one of the one or more offers relating to the travel experience, as described above.

As further shown in FIG. 6, process 600 may include providing, to one or more customer devices associated with the one or more customers of the set of customers, the one or more travel offer packages (block 670). For example, the device (e.g., using computing resource 265, processor 320, memory 330, storage component 340, communication interface 370, and/or the like) may provide, to one or more customer devices associated with the one or more customers of the set of customers, the one or more travel offer packages, as described above.

Process 600 may include additional implementations, such as any single implementation or any combination of implementations described below and/or in connection with one or more other processes described elsewhere herein.

In a first implementation, process 600 may include receiving, from the one or more customer devices, one or more responses to the one or more travel offer packages; and updating the second machine learning model based on the one or more responses.

In a second implementation, alone or in combination with the first implementation, the one or more offers relating to the travel experience may relate to one or more of a transportation service, admission to an event at a particular location, lodging, or an equipment rental.

In a third implementation, alone or in combination with one or more of the first and second implementations, assigning the plurality of customers to the plurality of clusters may include using one or more machine learning processes to assign the plurality of customers to the plurality of clusters, and the one or more machine learning processes may include one or more of a process that uses a K-nearest neighbor model, a process that uses a collaborative filtering model, or a hierarchical Dirichlet process.

In a fourth implementation, alone or in combination with one or more of the first through third implementations, process 600 may include identifying the one or more customers of the set of customers to provide with the one or more travel offer packages, and identifying the one or more customers of the set of customers may include using a customer selection model, trained using historical outcomes of providing travel offer packages to customers associated with particular transaction data, to identify the one or more customers of the set of customers.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

A customer interface may include a graphical customer interface, a non-graphical customer interface, a text-based customer interface, or the like. A customer interface may provide information for display. In some implementations, a customer may interact with the information, such as by providing input via an input component of a device that provides the customer interface for display. In some implementations, a customer interface may be configurable by a device and/or a customer (e.g., a customer may change the size of the customer interface, information provided via the customer interface, a position of information provided via the customer interface, and/or the like). Additionally, or alternatively, a customer interface may be pre-configured to a standard configuration, a specific configuration based on a type of device on which the customer interface is displayed, and/or a set of configurations based on capabilities and/or specifications associated with a device on which the customer interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, data associated with transactions between a plurality of merchants and a plurality of customers;
generating, by the device, based on the data, and based on a first machine learning model associated with a collaborative filtering model, a prediction associated with responsiveness by a particular customer, of the plurality of customers, to a particular offer, of a plurality of offers,
wherein the collaborative filtering model generates the prediction based on collecting information from the plurality of customers;
assigning, by the device and based on the prediction, the particular customer to a particular cluster of a plurality of clusters;
identifying, by the device and based on using a second machine learning model, a travel experience that has a threshold likelihood of being of interest to one or more customers, including the particular customer, associated with the particular cluster of the plurality of clusters,
wherein the travel experience is identified based on one or more data items that are determined from a set of transaction data associated with the one or more customers;
identifying, by the device and based on financial information associated with the one or more customers, a subset of the one or more customers to provide one or more offers associated with the travel experience,
wherein the financial information includes at least one of timeliness of payment, total deposit, or expenses paid;
providing, by the device and to the subset of the one or more customers, the one or more offers; and
updating, by the device and based on a response received in response to providing the one or more offers, the second machine learning model.

2. The method of claim 1, wherein the collaborative filtering model is used to generate the prediction based on collecting information from the plurality of customers.

3. The method of claim 1, further comprising:
identifying a geographical location of the particular customer; and
receiving, based on the geographical location, the one or more offers.

4. The method of claim 1, further comprising:
identifying a geographical location of the particular customer,
wherein the geographical location is identified based on the set of transaction data; and
receiving, based on the geographical location, the one or more offers.

5. The method of claim 1, further comprising:
receiving, from the particular customer, a response to the one or more offers; and
removing, based on the response and from the set of customers, information identifying the particular customer.

6. The method of claim 1, further comprising:
providing, to the subset of the one or more customers, one or more additional offers at predefined intervals.

7. The method of claim 1, wherein the threshold likelihood is based on a quantity of customers of the set of customers that are associated with a product associated with the travel experience.

8. A device, comprising:
one or more memories; and
one or more processors, coupled to the one or more memories, configured to:
receive data associated with transactions between a plurality of merchants and a plurality of customers;
generate, based on the data and based on a first model, a prediction associated with responsiveness by a particular customer, of the plurality of customers, to a particular offer, of a plurality of offers,
wherein the first model is associated with a collaborative filtering model that generates the prediction based on collecting information from the plurality of customers;
assign, based on the prediction, the particular customer to a particular cluster of a plurality of clusters;
identify, based on using a second model, a travel experience that has a threshold likelihood of being of interest to one or more customers, including the particular customer, associated with the particular cluster of the plurality of clusters,
wherein the travel experience is identified based on information determined from a set of transaction data associated with the one or more customers;
identify, based on financial information associated with the one or more customers, a subset of the one or more customers to provide one or more offers associated with the travel experience,
wherein the financial information includes at least one of timeliness of payment, total deposit, or expenses paid;
provide, to the subset of the one or more customers, the one or more offers; and
update, based on a response received in response to providing the one or more offers, the second model.

9. The device of claim 8, wherein the first model is used to generate the prediction based on collecting information from the plurality of customers.

10. The device of claim 8, wherein the one or more processors are further configured to:
identify a geographical location of the particular customer; and
receive, based on the geographical location, the one or more offers.

11. The device of claim 8, wherein the one or more processors are further configured to:
identify a geographical location of the particular customer,
wherein the geographical location is identified based on the set of transaction data; and
receive, based on the geographical location, the one or more offers.

12. The device of claim 8, wherein the one or more processors are further configured to:
receive, from the particular customer, a response to the one or more offers; and
remove, based on the response and from the set of customers, information identifying the particular customer.

13. The device of claim 8, wherein the one or more processors are further configured to:
provide, to the subset of the one or more customers, one or more additional offers at predefined intervals.

14. The device of claim 8, wherein the threshold likelihood is based on a quantity of customers of the set of customers that are associated with a product associated with the travel experience.

15. A non-transitory computer-readable medium storing a set of instructions, the set of instructions comprising:
one or more instructions that, when executed by one or more processors of a device, cause the device to:
receive data associated with transactions between a plurality of merchants and a plurality of customers;
generate, based on the data and based on a first model, a prediction associated with responsiveness by a particular customer, of the plurality of customers, to a particular offer, of a plurality of offers,
wherein the first model is associated with a collaborative filtering model that generates the prediction based on collecting information from the plurality of customers;
assign, based on the prediction, the particular customer to a particular cluster of a plurality of clusters;
identify, based on using a second model, a travel offer that has a threshold likelihood of being of interest to one or more customers, including the particular customer, associated with the particular cluster of the plurality of clusters,
wherein the travel offer is identified based on one or more data items that are determined from a set of transaction data associated with the one or more customers;
identify, based on financial information associated with the one or more customers, a subset of the one or more customers to provide one or more offers associated with the travel offer,
wherein the financial information includes at least one of timeliness of payment, total deposit, or expenses paid;
provide, to the subset of the one or more customers, the one or more offers; and
update, based on a response received in response to providing the one or more offers, the second model.

16. The non-transitory computer-readable medium of claim 15, wherein the first model is used to generate the prediction based on collecting information from the plurality of customers.

17. The non-transitory computer-readable medium of claim 15, wherein the one or more instructions further cause the device to:
identify a geographical location of the particular customer; and
receive, based on the geographical location, the one or more offers.

18. The non-transitory computer-readable medium of claim 15, wherein the one or more instructions further cause the device to:
identify a geographical location of the particular customer,
wherein the geographical location is identified based on the set of transaction data; and
receive, based on the geographical location, the one or more offers.

19. The non-transitory computer-readable medium of claim 15, wherein the one or more instructions further cause the device to:

receive, from the particular customer, a response to the one or more offers; and remove, based on the response and from the set of customers, information identifying the particular customer.

20. The non-transitory computer-readable medium of claim 15, wherein the one or more instructions further cause the device to:

provide, to the subset of the one or more customers, one or more additional offers at predefined intervals.

* * * * *